(12) United States Patent
Mifsud

(10) Patent No.: US 10,230,079 B2
(45) Date of Patent: Mar. 12, 2019

(54) BATTERY SYSTEM FOR MOBILE WORKSTATION

(71) Applicant: Bytec Healthcare Limited, Redhill, Surrey (GB)

(72) Inventor: Bernard Mifsud, Redhill (GB)

(73) Assignee: BYTEC HEALTHCARE LIMITED, Redhill, Surrey (GB)

( * ) Notice: Subject to any disclaimer, the term of this patent is extended or adjusted under 35 U.S.C. 154(b) by 216 days.

(21) Appl. No.: 14/931,382

(22) Filed: Nov. 3, 2015

(65) Prior Publication Data

US 2016/0126513 A1    May 5, 2016

(30) Foreign Application Priority Data

Nov. 3, 2014 (GB) ................................. 1419533.3

(51) Int. Cl.

| | |
|---|---|
| *H01M 2/12* | (2006.01) |
| *H01M 2/10* | (2006.01) |
| *H01M 10/6551* | (2014.01) |
| *H01M 10/623* | (2014.01) |
| *H01M 10/66* | (2014.01) |
| *H01M 10/613* | (2014.01) |
| *H02J 7/00* | (2006.01) |

(52) U.S. Cl.
CPC ....... *H01M 2/1022* (2013.01); *H01M 10/613* (2015.04); *H01M 10/623* (2015.04); *H01M 10/6551* (2015.04); *H01M 10/66* (2015.04); *H02J 7/0044* (2013.01); *H01M 2220/30* (2013.01)

(58) Field of Classification Search
CPC ............. H01M 2/1022; H01M 10/613; H01M 10/623; H01M 10/6551; H01M 10/66; H01M 2220/30; H02J 7/0045
See application file for complete search history.

(56) References Cited

U.S. PATENT DOCUMENTS

| | | |
|---|---|---|
| 3,878,387 A | 4/1975 | Kovacic |
| 6,591,929 B1 | 7/2003 | Tsuboi et al. |
| 2009/0086043 A1 | 4/2009 | Scheucher |
| 2010/0264738 A1 | 10/2010 | Murtha et al. |
| 2017/0288315 A1* | 10/2017 | Scheucher ............... H01Q 9/30 |

FOREIGN PATENT DOCUMENTS

| | | |
|---|---|---|
| CN | 202884776 U | 4/2013 |
| EP | 2657119 A1 | 10/2013 |
| WO | 2014153467 A2 | 9/2014 |

OTHER PUBLICATIONS

Search Report from the United Kingdom Intellectual Property Office dated Jun. 30, 2015 for corresponding UK Application No. GB1419533.3, filed Nov. 3, 2014.

* cited by examiner

*Primary Examiner* — Raymond Alejandro
(74) *Attorney, Agent, or Firm* — David D. Brush; Westman, Champlin & Koehler, P.A.

(57) ABSTRACT

A retro-fit battery system for attachment to a mobile workstation having a generally upright post. The battery system includes a main body shaped so as to locate around at least part of the perimeter of a generally upright post and having a removable attachment to the post, wherein the main body further includes at least one battery docking mount to which a battery can be detachably connected, an electrical outlet and a control system for providing electrical energy from the battery to the electrical outlet.

14 Claims, 15 Drawing Sheets

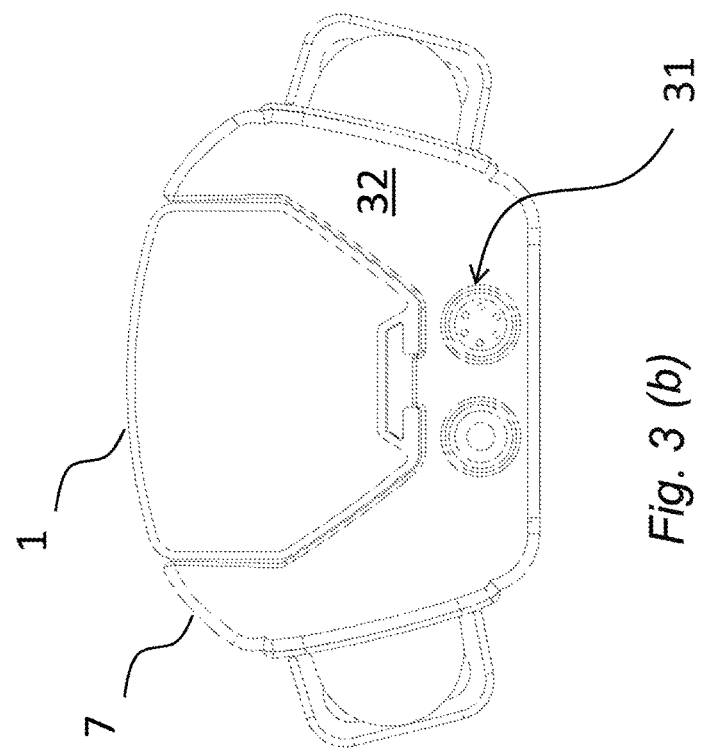
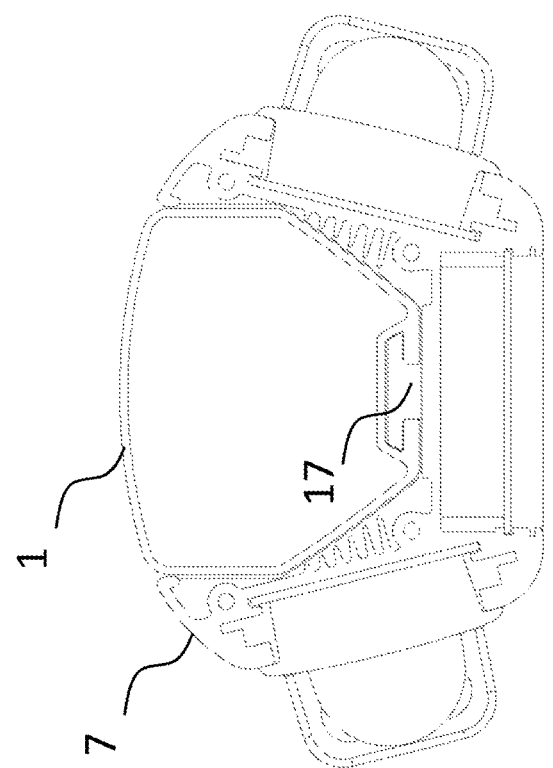

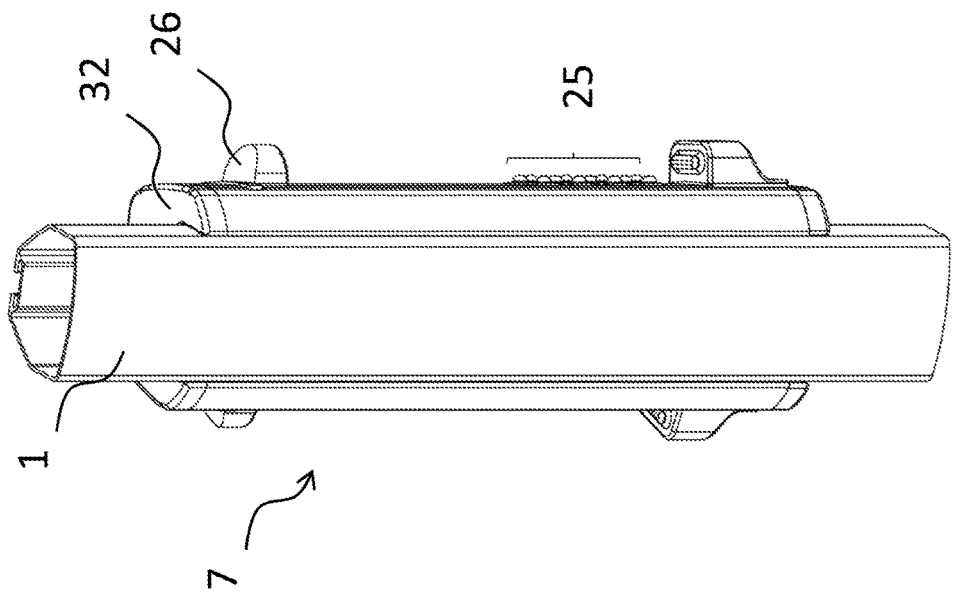
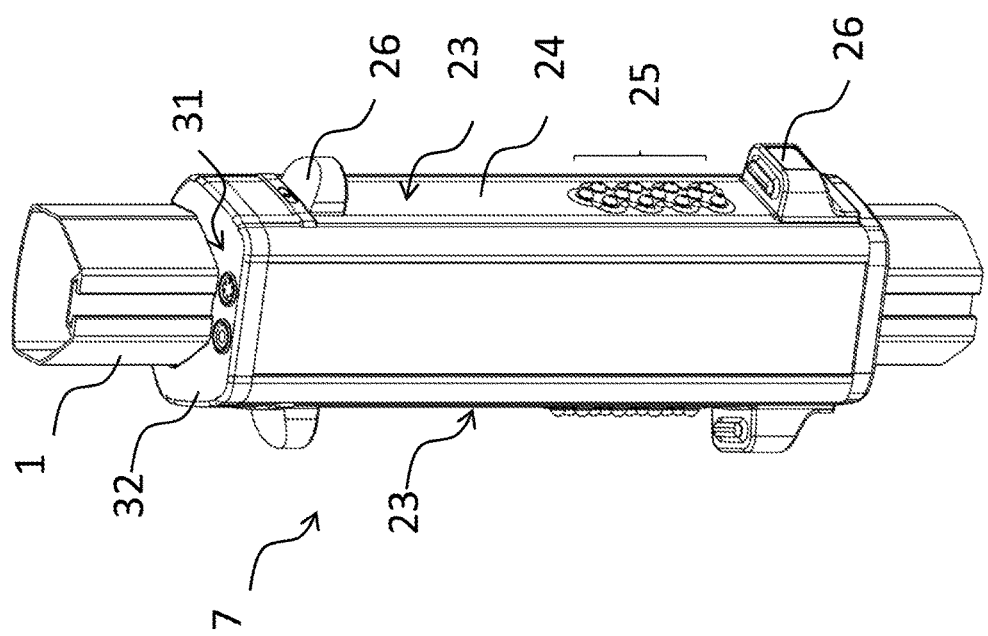
Fig. 3 (d)
Fig. 3 (c)

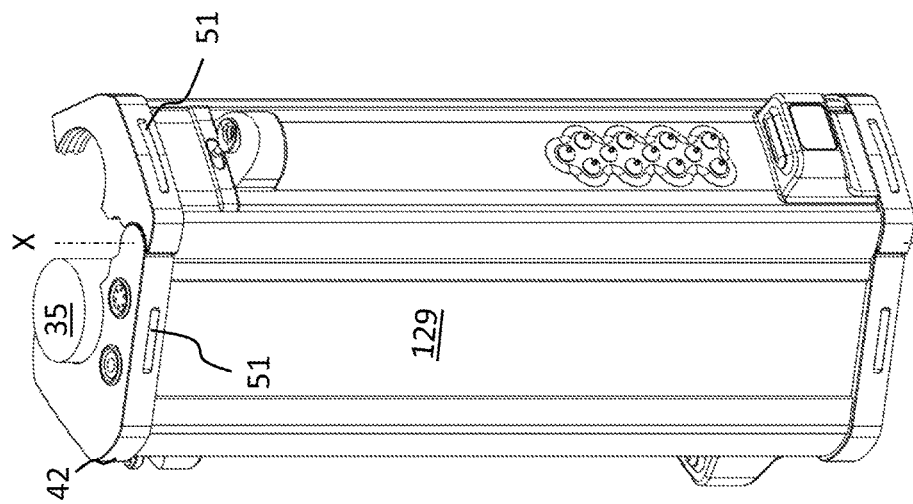
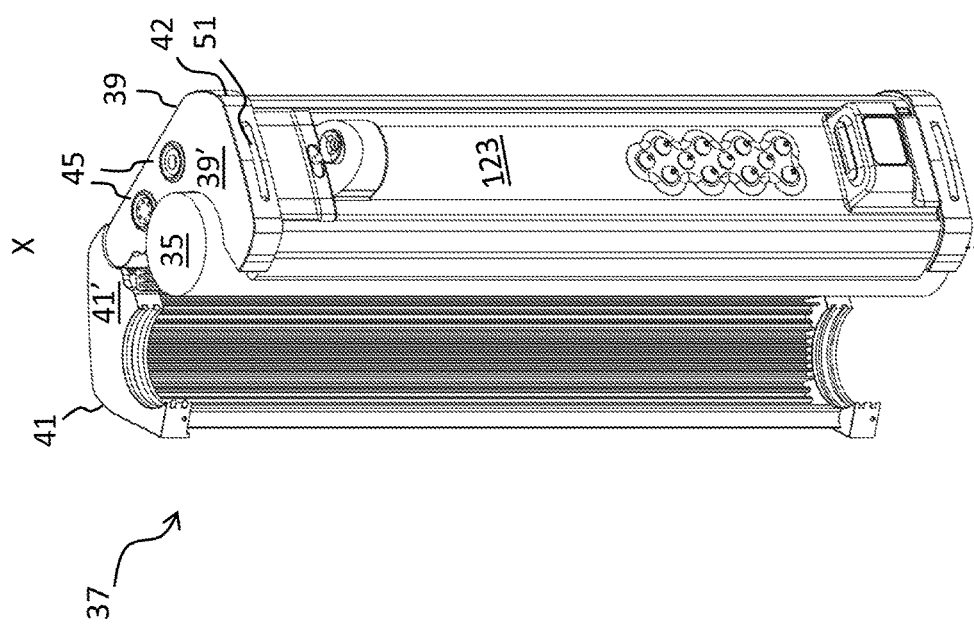

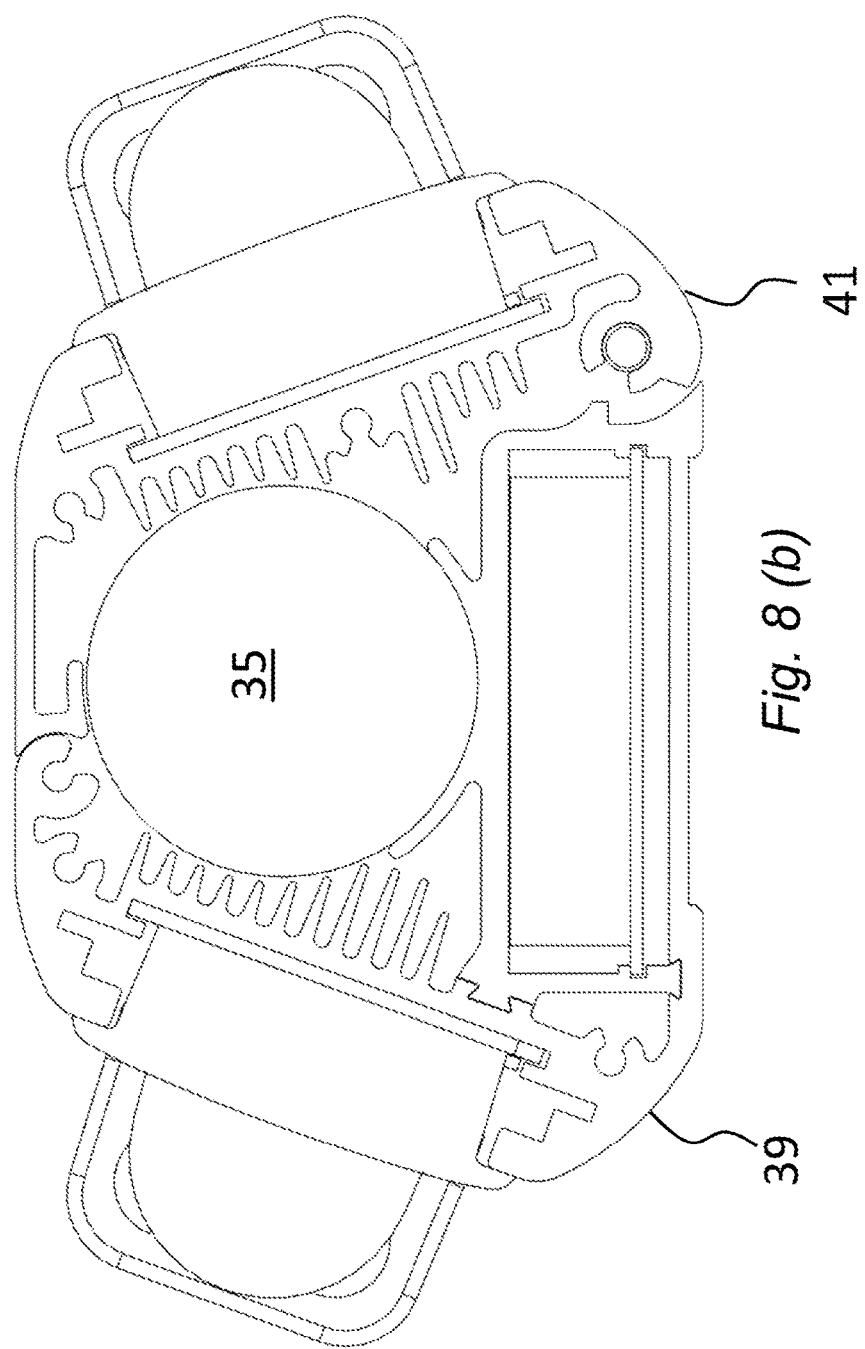

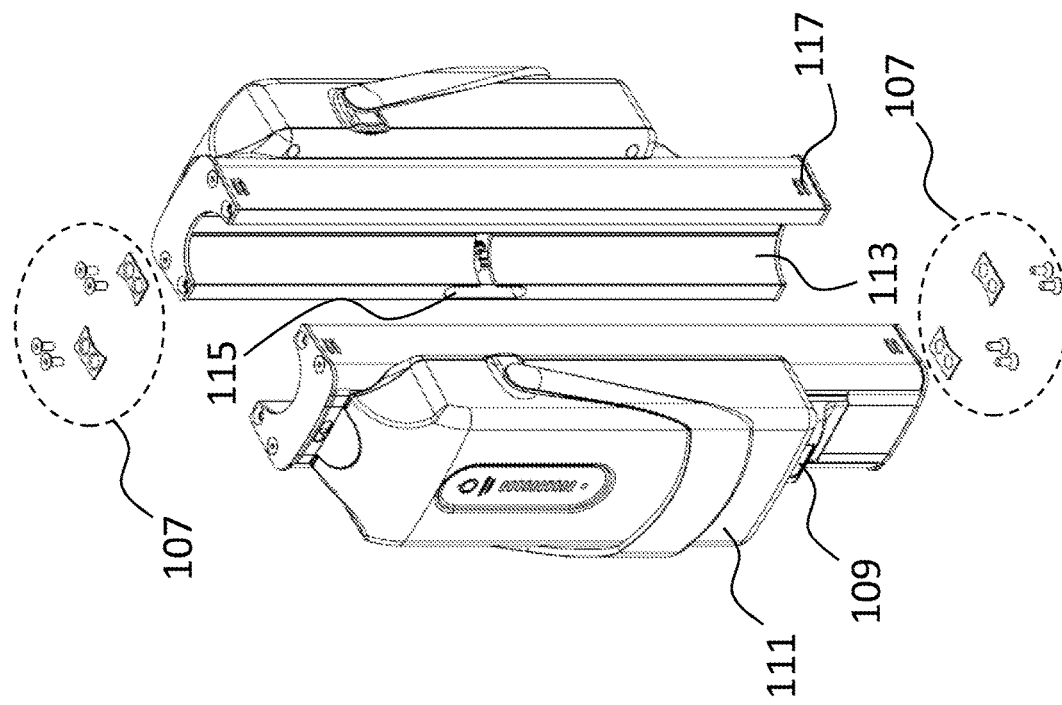
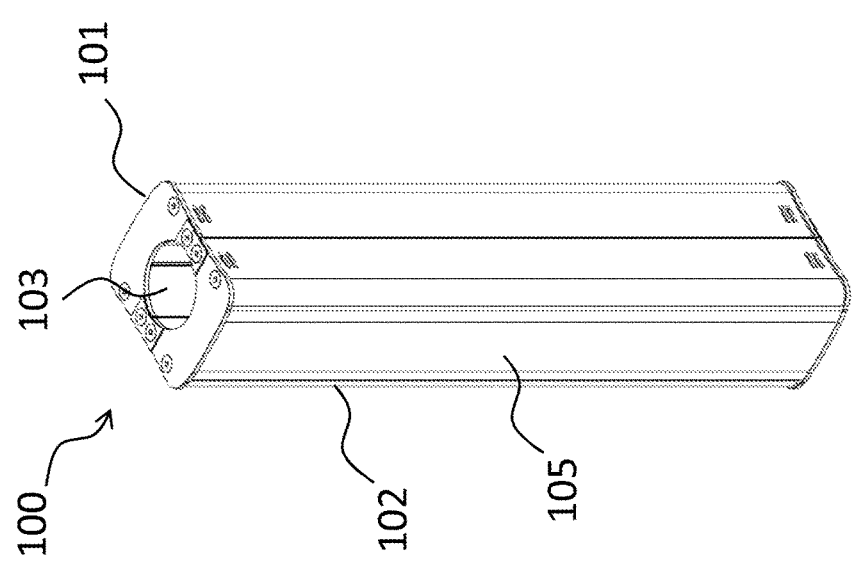
Fig. 10
Fig. 9

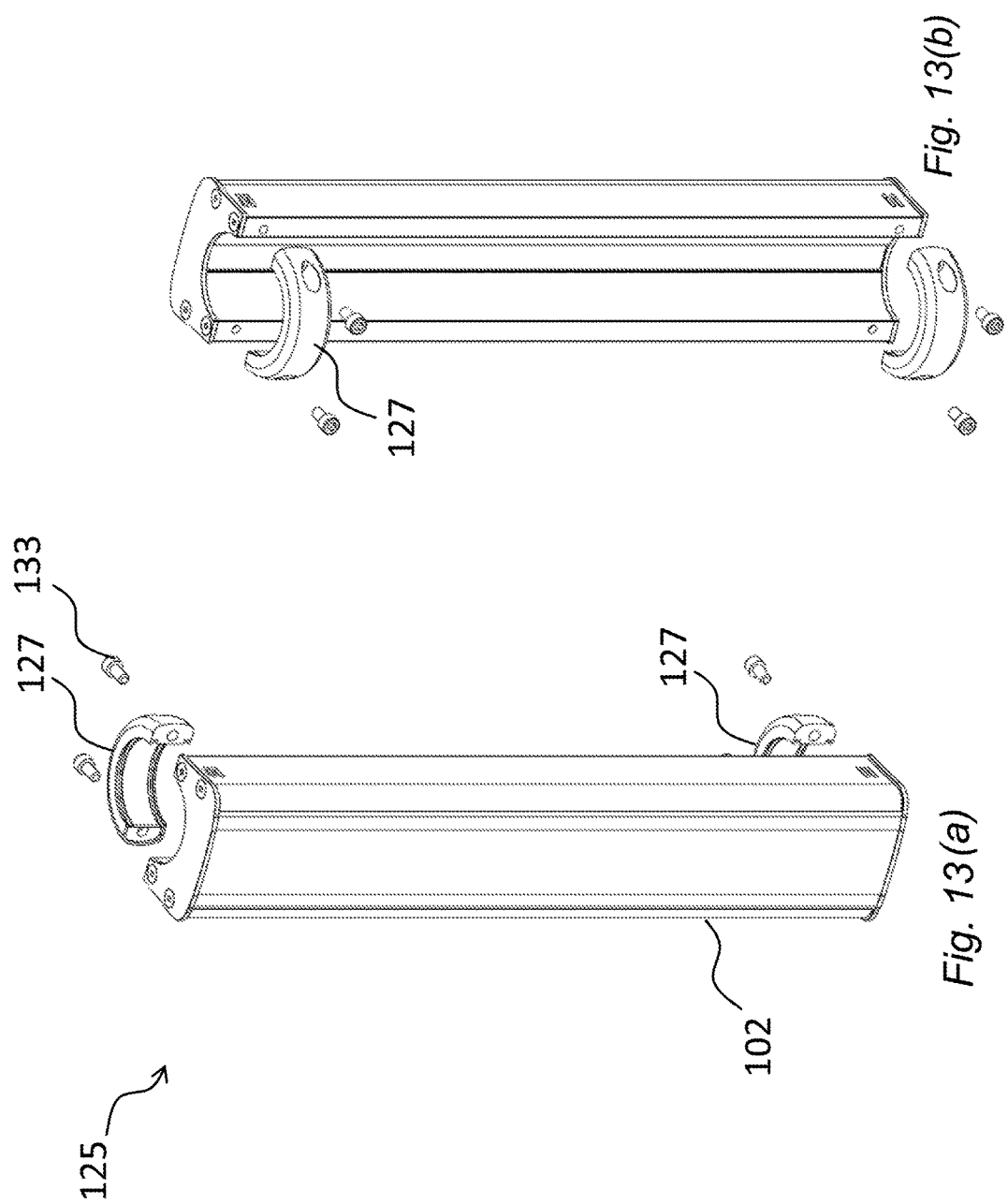

BATTERY SYSTEM FOR MOBILE WORKSTATION

FIELD OF THE DISCLOSURE

The present disclosure relates to a battery system for a mobile workstation, particularly, though not exclusively, a mobile medical cart.

BACKGROUND TO THE DISCLOSURE

Mobile workstations are desirable in various settings, typically comprising a vertical support post, mounted on a wheeled base and a tray or platform mounted on top of the post for supporting electronic equipment. Sometimes the post will itself will directly support the equipment. In healthcare environments, for example, the electronic equipment may comprise medical equipment, computing equipment or entertainment equipment.

Such workstations may be 'powered' by an on-board battery system, permanently mounted to the pole. The battery system comprises one or more battery docking brackets to which rechargeable batteries can be removably attached. Each battery can be detached and recharged remotely from the battery system, or charged in-situ by plugging a mains lead from the system into a mains supply. When charged, a battery supplies power to the electronic equipment using a cable that passes from the battery interface upwards to one or more connectors near the tray or platform. Where two or more batteries are provided, so-called hot-swapping can occur, whereby when one battery is depleted, another battery with sufficient charge is automatically used.

Non-powered mobile workstations still exist in many settings and, where powered workstations are required, the old ones are discarded to be replaced by powered ones at significant cost.

SUMMARY

A first aspect of the disclosure provides a retro-fit battery system for attachment to a mobile workstation having a generally upright post, the battery system comprising a main body shaped so as to locate around at least part of the perimeter of a generally upright post and having a removable attachment to said post, wherein the main body further comprises at least one battery docking mount to which a battery can be detachably connected, an electrical outlet and a control system for providing electrical energy from the battery to the electrical outlet.

The main body may have inner and outer sides, the inner side being that which is shaped to locate around the post perimeter and the outer side being that having the at least one battery mounting.

First and second battery docking mounts may be provided on the main body.

The control system may be configured automatically to switch connection between one of the docking mounts and the other in the event that the amount of energy detected in a connected battery is at or below a predetermined level.

The or each battery docking mount and/or the control system may be provided as modular unit(s) which removably locate within a respective bracket provided on the outer side of the main body.

The removable attachment of the battery system to a post may comprise a mechanical protrusion shaped to engage within a complementary groove on the post in a tongue-and-groove like manner.

The main body may be formed of first and second body sections, one being rotatable relative to the other about a first axis between open and closed positions so that, in use, the two sections when open can be positioned around an upright post and then closed to grip the post to provide the removable attachment.

Each of the first and second body sections may be shaped so that, when in the closed position, they define an enclosed internal channel that in use surrounds the post.

One or more heat sink elements may be provided on an internal wall of at least one body section so that, when in the closed position, the heat sink elements will be close to, or touch, a post around which the system is located in use. A plurality of heat sink elements may be provided on internal wall(s) of the body sections, the cross-sectional profile of the heat sink elements being such that they conform closely with the radius of the post around which the system is located in use.

At least one of the body sections may comprise a venting aperture extending from the interior to the exterior. The at least one venting aperture may be angled so as to extend downwardly from the interior to the exterior. The at least one venting aperture may be positioned towards the base of the system, and wherein a drainage aperture is provided in a base wall, in the region of the venting aperture.

A second aspect of the disclosure provides a retro-fit battery system for attachment to a mobile workstation having a generally upright post, the battery system comprising a main body formed of first and second sections hingedly attached along a first axis and defining between the sections a channel at least partially shaped to correspond substantially to the outer shape of a workstation post, the first and second sections being configured so as to move between open and closed positions to enable the battery system to be located around and to grip a post, one or more of the sections being arranged to carry on the exterior at least one battery docking unit and a control system associated with delivering electrical energy to and/or from the battery.

A third aspect of the disclosure provides a method of retrofitting a battery system according to previous definitions, comprising the steps of:

positioning the first and second sections to the open position;

locating the first and second sections around the post of a workstation; and positioning the first and second sections to the closed position.

BRIEF DESCRIPTION OF THE DRAWINGS

The disclosure will now be described by way of example only with reference to the accompanying diagrammatic drawings in which:—

FIG. 3a is a cross-sectional diagram of the FIG. 2 power system when connect to the FIG. 1 pole;

FIG. 3b is a plan view diagram of the FIG. 2 power system when connected to the FIG. 1 pole;

FIG. 3c is a front perspective view diagram of the FIG. 2 power system when connected to the FIG. 1 pole;

FIG. 3d is a rear perspective view diagram of the FIG. 2 power system when connected to the FIG. 1 pole;

FIG. 9 is a perspective view of a third embodiment portable power system according to the disclosure;

FIG. 10 is an exploded perspective view of the FIG. 9 embodiment;

FIG. 13a is a front perspective view of a fourth embodiment portable power system according to the disclosure;

FIG. 13b is a rear perspective view of the fourth embodiment portable power system according to the disclosure;

DETAILED DESCRIPTION OF ILLUSTRATIVE EMBODIMENTS

Embodiments herein relate to portable power systems for retrofitting to non-powered mobile workstations of the type comprising a wheeled base and an upright pole.

The power systems can however be retrofitted to any unit having an upright which can be of any cross-sectional shape.

Figure 1:
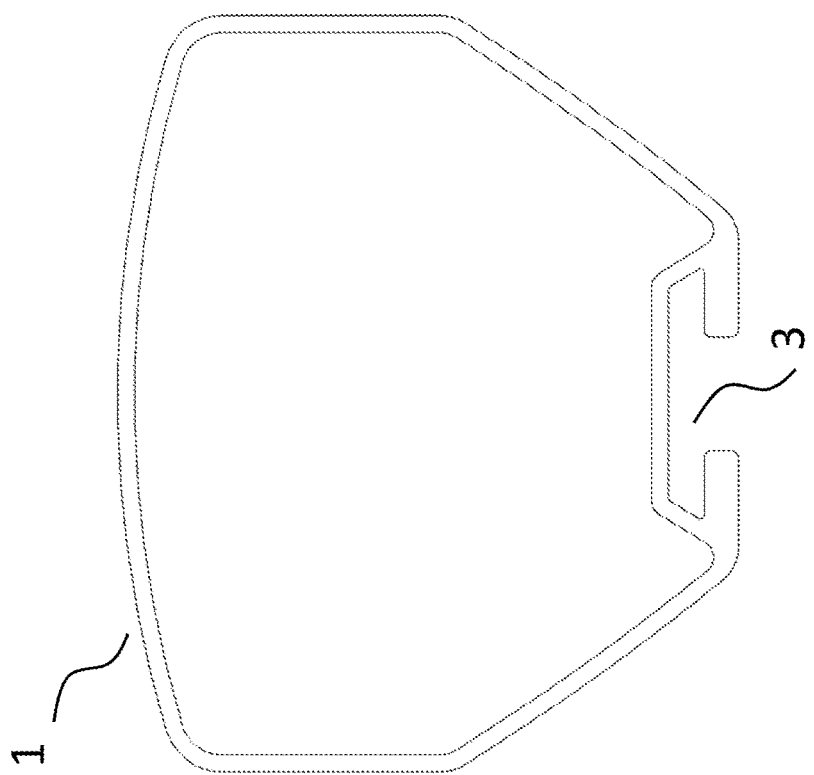
FIG. 1 is a cross-sectional diagram of a known workstation pole, which is useful for understanding an embodiment of the disclosure.

Referring to FIG. 1, the cross-section of a workstation pole 1 comprises a metal extrusion which has a vertical channel generally indicated 3. This represents the pole of a known medical workstation.

Figure 2:
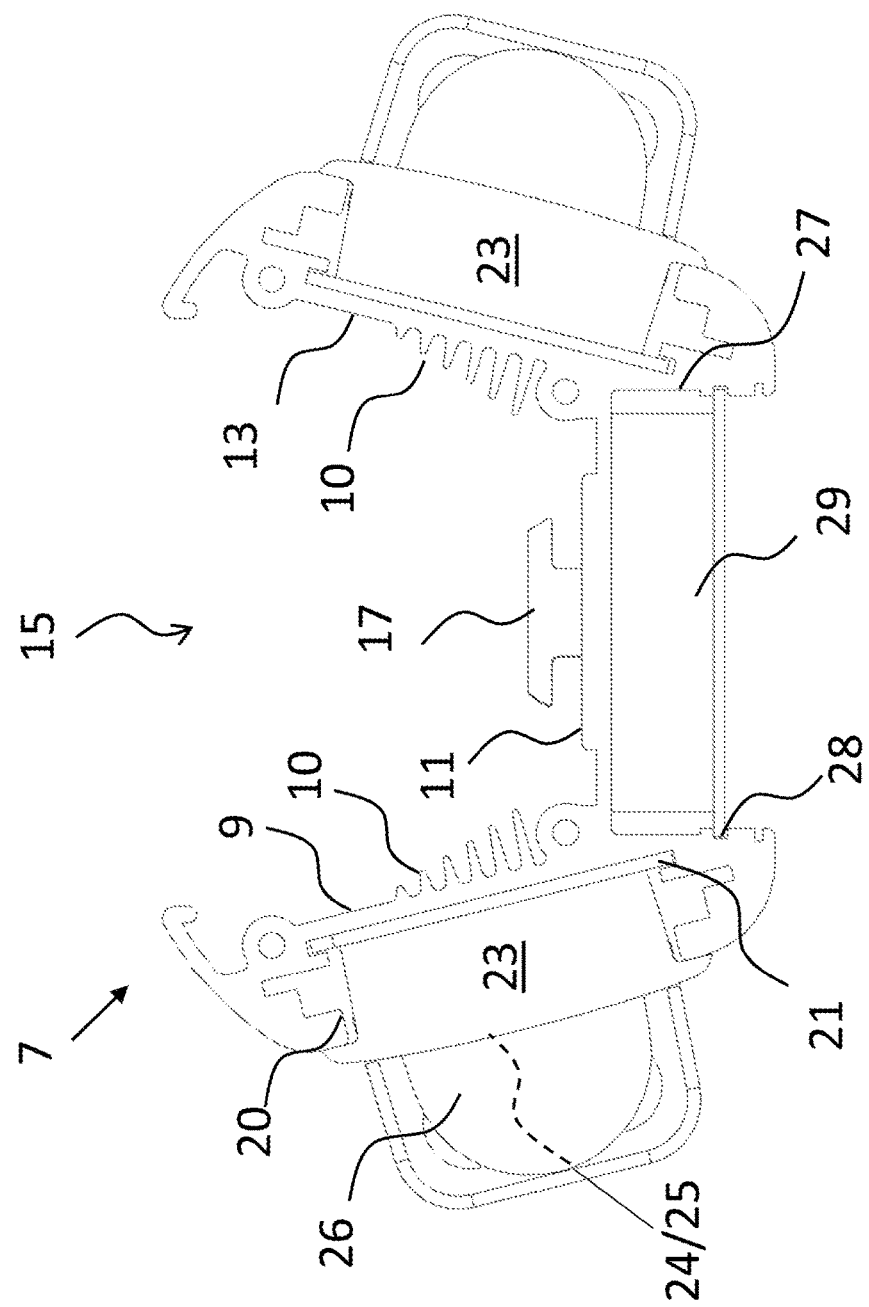
FIG. 2 is a cross-sectional diagram of a first embodiment portable power system according to the disclosure, for retrofitting onto the FIG. 1 pole.
Figure 4:
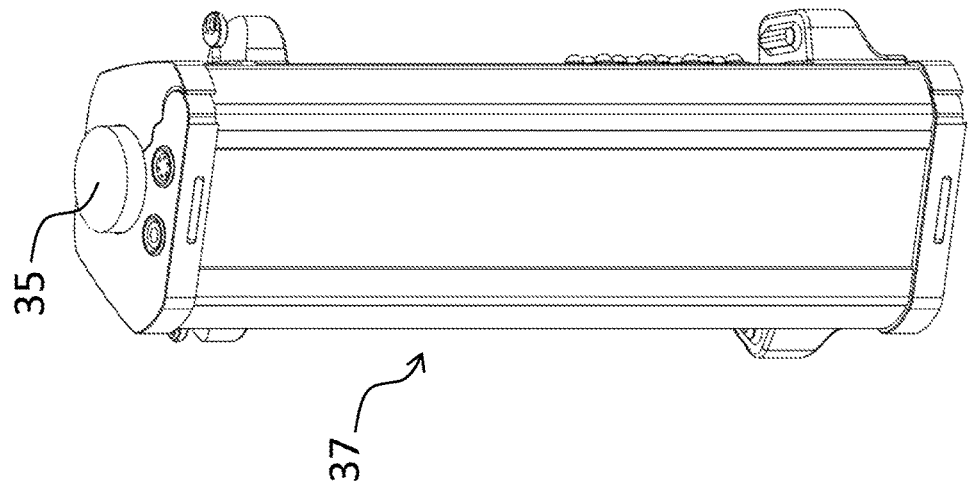
FIG. 4a is a perspective view of a second embodiment portable power system according to the disclosure in open configuration, from one side.
FIG. 4b is a perspective view of the second embodiment system according to the disclosure in open configuration, from a reverse side.
FIG. 4c is a perspective view of the second embodiment system according to the disclosure in closed configuration, from one side.
FIG. 4d is a perspective view of the second embodiment portable power system according to the disclosure in closed configuration, from the reverse side.
Figure 4:
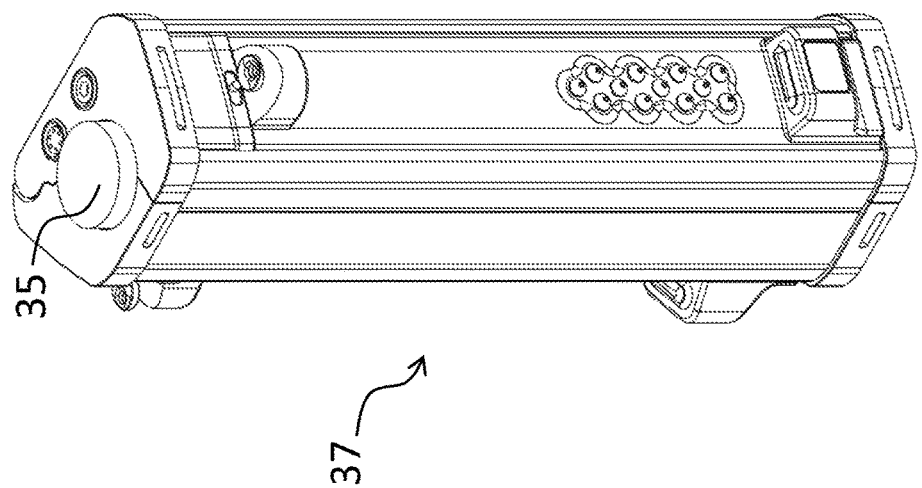

FIG. 2 shows a first embodiment power system 7 configured to detachably retrofit to the pole 1 shown in FIG. 1.

The power system 7 comprises a three-sided body defining an inner channel 15 dimensioned to locate snugly around a major part of the extrusion, as indicated in FIG. 3 which shows the two parts inter-connected. The three sides comprise outer walls 9, 13 and an intermediate wall 11. A generally T-shaped tab or tongue 17 is provided, extending into the channel 15 from the centre of the intermediate wall 11 and is shaped and positioned so as to snugly fit inside the vertical channel 3 by means of a tongue-and-groove fit, which can be a friction fit.

The inner surface of each outer wall 9, 13 carries a series of integrally-formed vertical blades, generally indicated 10, which serve as heat sink elements. The cross-sectional profile of the heat sink elements 10 is arranged such that the footprint conforms substantially to that of the pole exterior around which it is to be located, but does not touch the pole in order to isolate the power system 7 electrically from the pole in the event of failure.

On the external side of each outer wall 9, 13 is provided a channel defined by opposed lateral walls 20 upstanding from the outer wall. Within each lateral wall 20 is a vertical slot 21. The channels in-between the walls 20 provide regions within which a modular battery docking unit 23 is slidably inserted, with correspondingly-shaped edges of said docking unit locating within the slots 21. The exposed face 24 of each battery docking unit 23 reveals external battery terminals 25 (not visible in the Figure) and a docking mechanism 26 for the detachable connection of a rechargeable battery. This mechanism is conventional.

The intermediate wall 11 similarly provides an external channel defined by opposed walls 27 each having a slot 28 on the inner sides to which a modular control unit 29 can be inserted (and which can be removed for repair and replacement as and when required) in a manner similar to the battery docking units 23. The control unit 29 is configured such that it is connected to the battery docking units 23 via leads on one side.

FIG. 3a shows in plan view the power system 7 connected to the extrusion 1 with the tongue 17 engaged within the channel 3. FIG. 3b is the same view, with a cover 32 fixed over the battery docking units 23 and the control unit 29, and carries connector sockets 31 to which the control unit is connected by leads.

FIGS. 3c and 3d show in perspective view the power system 7 when connected around the extrusion, when viewed from opposite sides.

Separate connectors in use connect to the sockets 31, one for the delivery of electricity to components being used on the workstation, and another for USB data.

It will be appreciated that the control unit 29 provides control functionality for the battery docking units 23, including the regulation of d.c. electricity to and from connected batteries, and optionally, intelligent functions. One example of an intelligent function is the provision of so-called 'hot swapping' whereby a switch is made automatically between the different battery docking units 23 when the charge from the current connected battery is detected as being at or below a threshold. Another example is the authentication of connected batteries, in situations whereby the batteries are so-called 'intelligent batteries' comprising a microprocessor which identifies itself to the control unit as being valid or invalid. This prevents potentially hazardous situations resulting from the use of non-compliant batteries. Similarly, the docking units 23 can comprise microprocessors in order to authenticate themselves to the batteries.

Thus, the power system 7 provides a neat, portable and convenient unit that combines in this case two battery docking units 23, the associated control unit 29, and input and output sockets 31 in a single, self-contained unit that can be retrofitted to the pole 1 of a non-powered workstation without specialist skill or tools. The battery docking units 23 and control unit 29, as well as the upper and lower casings are substantially sealed and can be cleaned by wiping. The power system 7 can be released and replaced quickly in the event of a fault. The modular nature of the battery docking units 23 and control unit 29 similarly allows quick diagnostics and replacement, if needed.

Alternative mechanisms of attaching the power system 7 to the pole 1 can be used, for example using a magnet on the power system.

A second embodiment power system 37 will now be described with reference to FIGS. 4 to 8.

Referring to FIGS. 4a to 4c, the power system 37 comprises a main body that in use is configured to completely surround a pole 35 in such a way as to clamp onto it, as shown particularly in FIGS. 4c and 4d.

The body is formed of first and second sections 39, 41 which are hingedly attached by an interconnecting internal rod (not shown) so as to rotate about a vertical axis X-X between open and closed positions. When in the closed position, the sections 39, 41 can be fixed together, for example with a screw system and/or clips. In use, the sections 39, 41 are opened, as shown in FIGS. 4a and 4b, placed around the pole 35, and then closed at which time the dimensions of an interior channel provide a friction fit to the pole, e.g. using an O-ring at the upper and lower ends.

This power system 37 is configured to carry modular docking units 123 and a modular control unit 129 in a manner identical to that of the first embodiment, i.e. by providing on the exterior a series of regions defined by grooved, upstanding walls, within which the modules are slidably located. The configuration and functionality of the docking units 123 and control unit 129, as well as the manner in which batteries can be connected to the docking units, is identical to that described previously.

Each of the first and second sections 39, 41 has an upper covering wall 39', 41' which substantially corresponds in shape to the cross-sectional profile of the respective section, capping-off the interior space. As shown more clearly in FIGS. 5 and 6, one of the upper walls 39' includes a pair of apertures 54 within which are located connectors 45 to which external leads can be connected to carry electricity to/from the power system 37.

Similar end-cap walls (not visible) are provided on the underside of the first and second sections 39, 41.

The end cap walls 39', 41', including the underside ones, snap-fit onto their respective sections 39, 41.

Each upper wall 39', 41' has a peripheral wall 42 in which is provided at least one aperture 51 which communicates with the internal space of the respective section when connected. Each aperture 51 provides a vent through which heat from inside can escape. In some embodiments, just one venting aperture 51 may be provided. In the present case, multiple vents 51 are provided. Vents are also provided in the underside end-cap walls.

Figure 6:
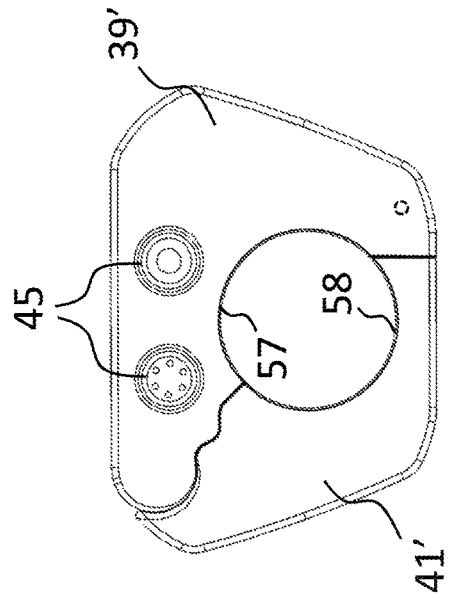
FIG. 6 is a plan view of upper covering walls of the FIG. 4 system.
Figure 5:
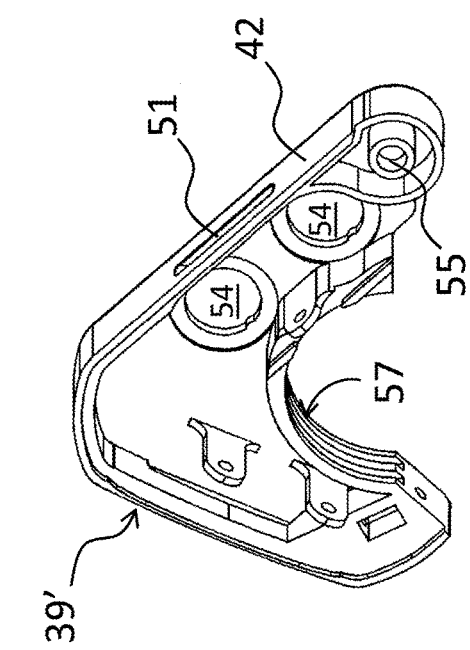
FIG. 5 is a rear perspective view of part of an upper covering wall of the FIG. 4 system.
Figure 7:
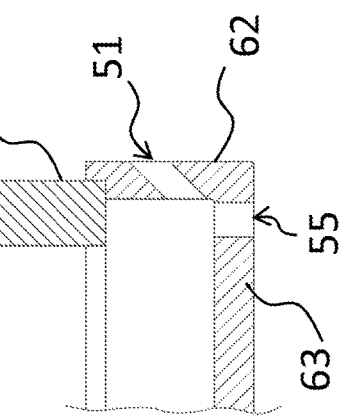
FIG. 7a is a schematic view of an upper part of the FIG. 4 system.
FIG. 7b is a schematic view of a lower part of the FIG. 4 system.
Figure 7:
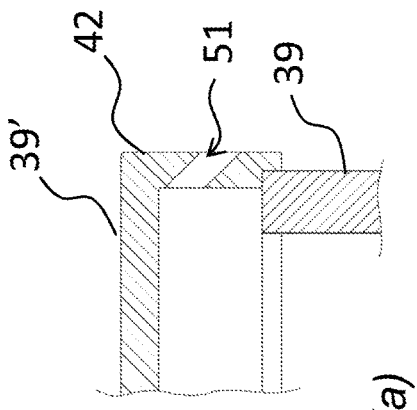
Figure 8:
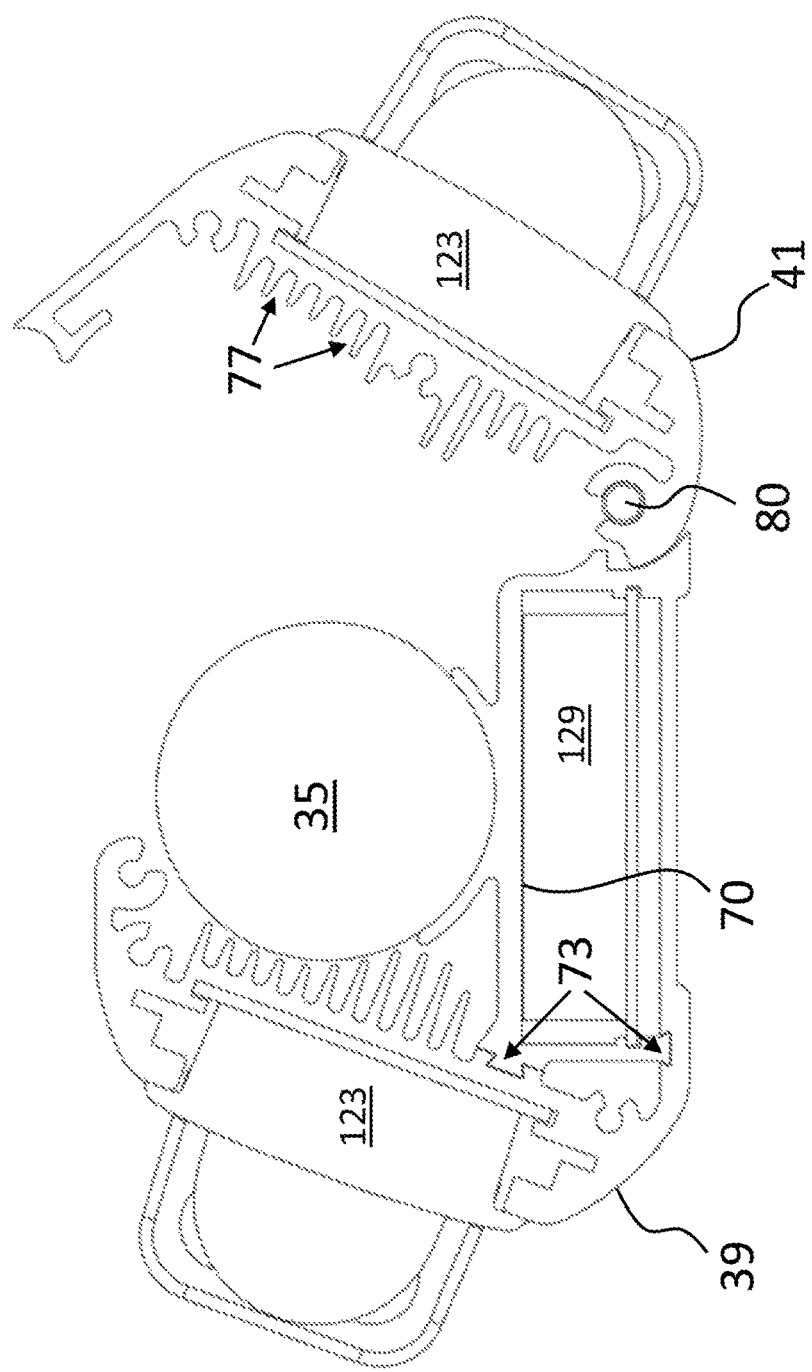
FIG. 8a is a cross-sectional view of the FIG. 4 system in an open configuration.
FIG. 8b is a cross section view of the FIG. 4 system in a closed configuration.
FIG. 8c is a top plan view of the FIG. 4 system in closed configuration.
FIG. 8d is a top plan view of the FIG. 4 system in open configuration.
Figure 8:
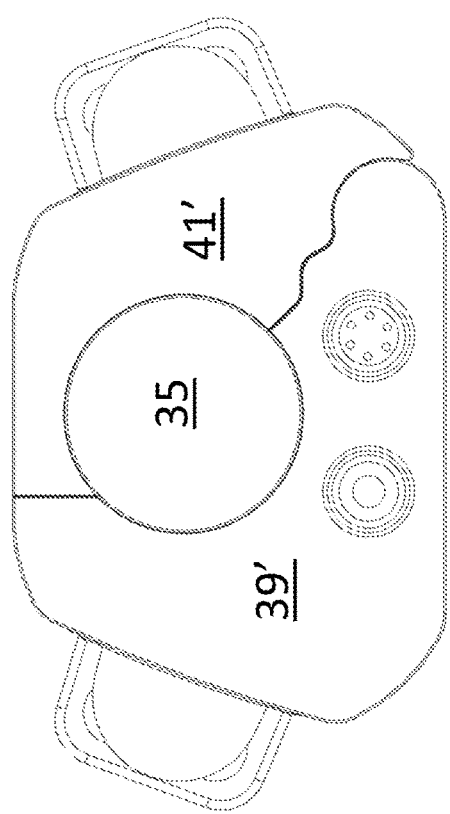
Figure 8:
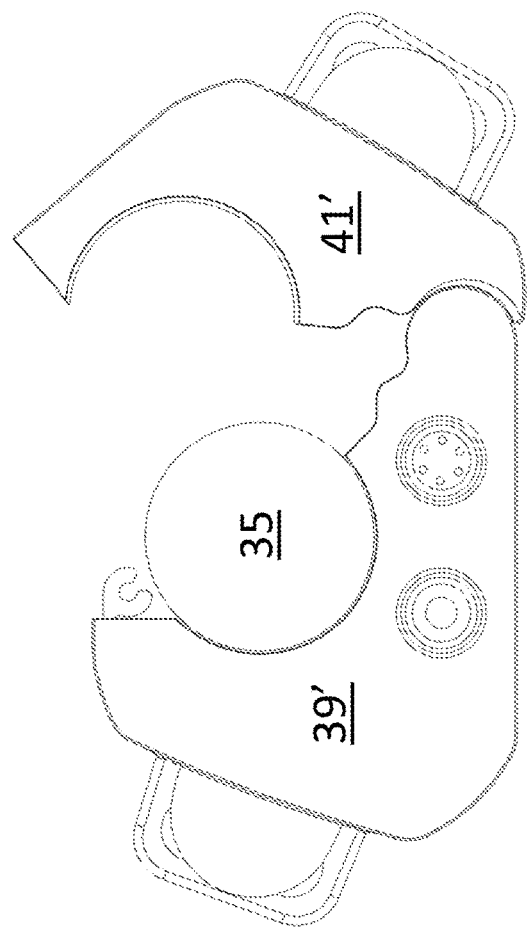

Referring to FIGS. 5 and 6, a cylindrical mount 55 is provided for holding one end of an internal hinge rod, the other end being connected within another mount on the opposite, lower end-cap wall. Curved interior walls 57, 58 on each of the end cap walls 39', 41' define a circular wall when in the closed position, as shown in FIG. 6, which closely conforms to that of the pole 35. The curved walls 57, 58 can be covered, coated or formed of a resilient substance, e.g. a rubber O-ring to help grip the pole 35 in position. Any mechanism or means of friction fitting can be employed for this purpose.

The geometry of the venting apertures 51 will be now explained in greater detail with reference to FIGS. 7a and 7b. FIG. 7a shows in section one of the apertures 51 in the upper end-cap wall 39'. The aperture 51 is angled so that it extends upwardly from between the exterior and interior sides of the peripheral wall 42. The purpose of this is to allow venting but prevent contaminants or liquid (e.g. when the unit is being wiped clean) entering the interior of the power system 37. FIG. 7b shows in section one of the apertures 51' in a corresponding lower end-cap 62. In this case, a further aperture 55 is provided in the base wall 63. The aperture 51' is angled downwards from between the exterior and interior sides of the peripheral wall, towards the further aperture 55 which acts as a drain for any liquid entering the interior.

FIGS. 8a and 8b show in cross-section the body sections 39, 41 in closed and opened positions, respectively.

It will be seen that the first body section 39 is formed by two interconnected metal extrusions, generally indicated 70, 72. The interconnection is made by correspondingly-shaped vertical channels 73. A battery docking unit 123 and the control unit 129 are each shown in position within exterior channels in the same manner as the first embodiment. The inner surface of each extrusion wall carries a series of integrally-formed vertical blades, generally indicated 77, which serve as heat sink elements. The cross-sectional profile of the heat sink elements is arranged such that the internal radius conforms substantially to that of the pole exterior around which it is to be located, but does not touch the pole in order to isolate the power system 37 electrically from the pole in the event of failure.

The second body section 41 is formed by a single metal extrusion, which has a hole 80 formed at one end through which passes the hinge rod along axis X-X. A battery docking unit 123 is shown in position within the exterior channel in the same manner as the first embodiment. The inner surface of this extrusion also carries a series of integrally-formed vertical metal blades 77 which are heat sink elements. Again, the cross-sectional profile of said elements 77 is such that they define an internal radius substantially similar to that of the pole exterior.

As is more clearly seen in FIG. 8b, when in the closed position, the heat sink elements 77 are close to the pole 35, serving to dissipate heat from the interior of the power unit 37.

FIGS. 8c and 8d show in plan view from above the body sections 39, 41 in the closed and open positions.

Similar technical advantages apply to the second embodiment power unit 37 as for the first embodiment.

A third embodiment power system 100 will now be described with reference to FIGS. 9 to 12. Referring to FIGS. 9 and 10, the power system 100 comprises separate first and second body sections 101, 102 each identical, or near identical, other than their opposed orientations with respect to a circular interior channel 103. The interior channel 103 is formed by U-shaped interior recesses on each body section 101, 102. The body sections 101, 102 when attached together are configured to completely surround a pole to clamp onto it, providing a retro-fit solution.

Each body section 101, 102 has a main face 105 (covered in FIG. 9) on which is mounted a modular docking unit 109 onto which a rechargeable battery 111 can be removably mounted; each docking unit 109 has the appearance and functionality of the docking units previously described. Two rechargeable batteries 111 can therefore be supported as before, with control circuitry provided as before to manage supply and switching as before.

As shown particularly in FIG. 10, the body sections 101, 102 are joined together at top and bottom ends by four metal plates 107, two at the top and two at the bottom. Each plate 107 is generally rectangular with an arcuate inner edge that conforms with the channel 103. Each plate 107 has a pair of holes that overlie a pair of screw holes within the body section 101, 102 upper ends, so that said sections can be screwed or bolted together at four locations either side of the channel 103.

The interior wall 113 of each body section 101, 102 has a cut 115 exposing a hollow interior section. The cuts 115 enable cabling associated with one docking unit 109 to pass to the other; the electronic control system (not shown) may for example be located within one interior section and therefore cabling from the other section can pass through the opposed cuts 115 to connect to the control system. The cuts 115 are generally T shaped, either side of a central channel.

Venting apertures or slots 117 are provided at the top and bottom of each body section 101, 102, and may have the same geometry structure and arrangement of those described previously, inhibiting contaminants and draining liquid therefrom.

Figure 11:
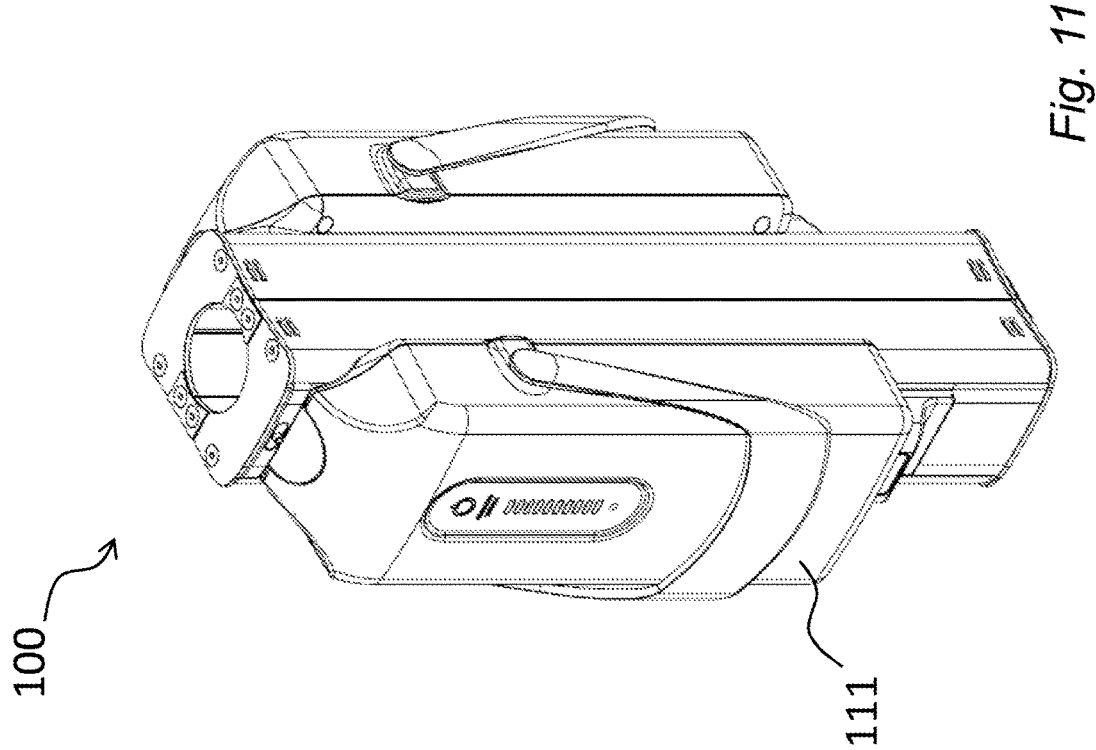
FIG. 11 is a perspective view of the FIG. 9 embodiment with battery modules attached.

FIG. 11 shows the body sections 101, 102 when joined and with the battery modules 11 mounted.

Figure 12:
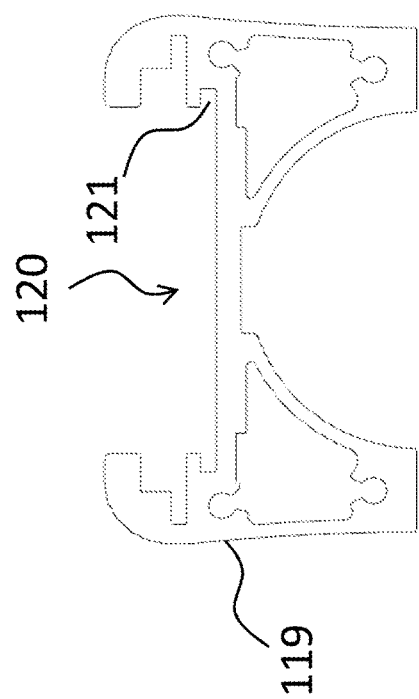
FIG. 12 is a top plan view of an extrusion which forms part of the FIG. 9 embodiment.

FIG. 12 shows in plan view a metal extrusion 119 which forms the main part of each body section, here body section 102. The rear part is an open channel 120 to permit the docking mechanism 109 to locate therewithin and has the same arrangement and geometry as that described with reference to FIG. 2, in terms of both the walls and docking mechanism which slidably locates within the slots 121.

The third embodiment has advantages in that each body section 101, 102 is identical, or substantially so, and so it is straightforward to construct a multi-battery system around a post, and replace sections as and when needed. As described below, it is also possible to provide a single section if appropriate.

Figure 14B:
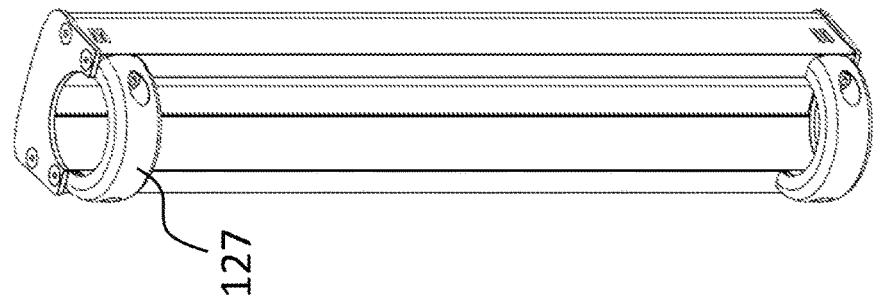
FIG. 14b is a rear perspective view of the FIG. 13 embodiment with attachments connected.
Figure 14:
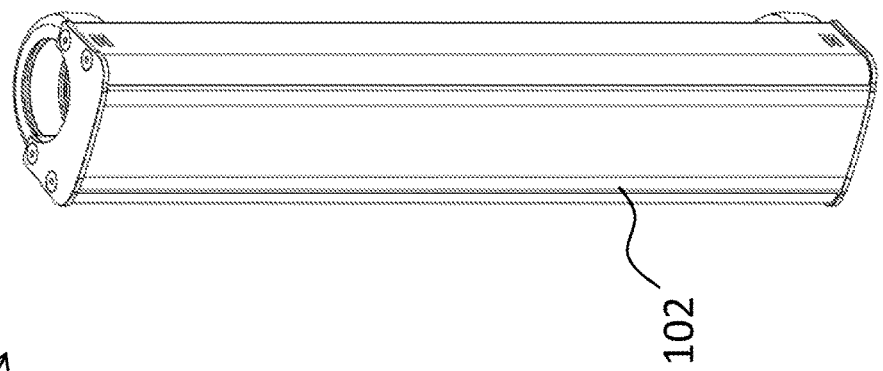
FIG. 14a is a front perspective view of the FIG. 13 embodiment with attachments connected.
Figure 15:
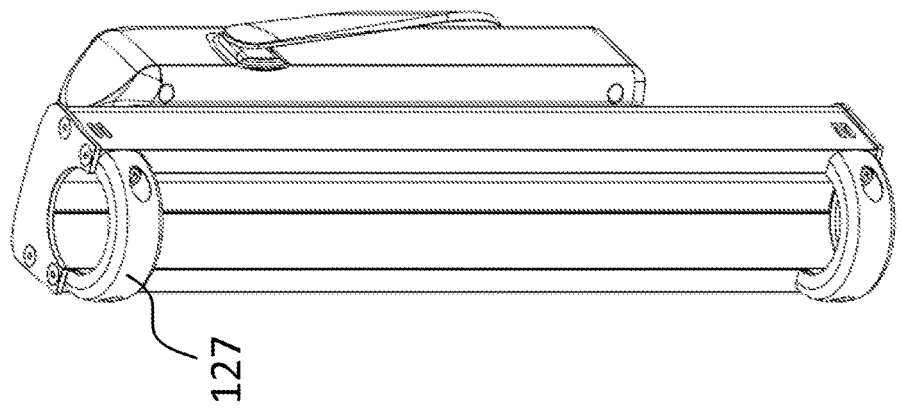
FIG. 15a is a front perspective view of the FIG. 13 embodiment with a battery module attached.
FIG. 15b is a rear perspective view of the FIG. 13 embodiment with a battery module attached.
Figure 15:
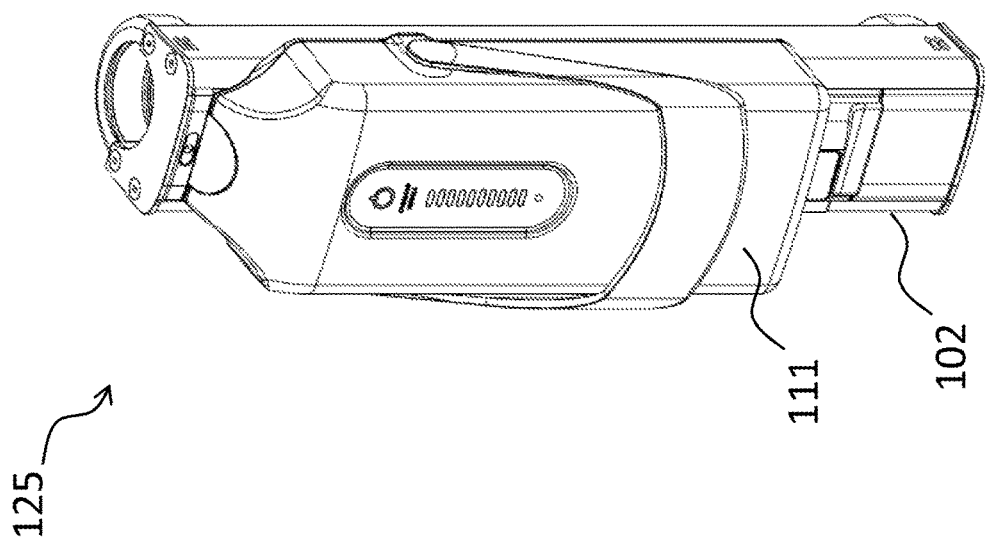

A fourth embodiment power system 125 will now be described with reference to FIGS. 13 to 15. In this case, only one body section, here body section 102, is employed for a single battery docking mechanism 109. The body section 102 is connected around a pole using a pair of semi-circular attachments 127 which screw into the interior face of the body section using screws 129. The attachments 127 can also be used to attach accessories such as baskets, handles and the like.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A retro-fit battery system for attachment to a mobile workstation having a generally upright post, the retro-fit battery system comprising:
    a main body shaped so as to locate around at least part of the perimeter of the generally upright post; and
    a removable attachment to the generally upright post,
    wherein the main body further comprises at least a first and a second battery docking mount to which a battery can be detachably connected, an electrical outlet and a control system for providing electrical energy from the battery to the electrical outlet
    wherein the main body has inner and outer sides, the inner side being that which is shaped to locate around the generally upright post perimeter and the outer side being that having the first and second battery docking mount;
    wherein the control system is configured automatically to switch connection between the first and second battery docking mounts in the event that an amount of energy detected in a connected battery is at or below a predetermined threshold,
    wherein the control unit is configured to authenticate a battery when connected to the first or second battery docking mount and which has a microprocessor that identifies the battery to the control unit as being valid or invalid; and
    wherein the first and second battery docking mounts each comprises a microprocessor in order to authenticate to the battery when connected to that battery docking mount.

2. The retro-fit battery system according to claim 1, wherein the first and second battery docking mounts and/or the control system is or are each provided as a modular unit which removably locates within a respective bracket provided on the outer side of the main body.

3. The retro-fit battery system according to claim 2, wherein the first, second and any other battery docking mount are provided as modular unit(s) which removably locate within a respective bracket provided on the outer side of the main body.

4. The retro-fit battery system according to claim 1, wherein the removable attachment of the retro-fit battery system to the generally upright post comprises a mechanical protrusion shaped to engage within a complementary groove on the generally upright post in a tongue-and-groove manner.

5. The retro-fit battery system according to claim 1, wherein the main body is formed of first and second body sections, one being rotatable relative to the another about a first axis between open and closed positions so that, in use, the first and second sections when open can be positioned around the generally upright post and then closed to grip the generally upright post to provide the removable attachment.

6. The retro-fit battery system according to claim 5, wherein each of the first and second body sections is shaped so that, when in the closed position, they define an enclosed internal channel that in use surrounds the generally upright post.

7. The retro-fit battery system according to claim 5, further comprising at least one heat sink element provided on an internal wall of at least one of the first or second body sections so that, when in the closed position, the heat sink element will be close to the generally upright post around which the retro-fit battery system is located in use.

8. The retro-fit battery system according to claim 7, wherein the main body comprises a plurality of body sections, including the first and second body sections, and wherein the at least one heat sink element comprises a plurality of heat sink elements, each of which is provided on an internal wall of a respective one of the plurality of body sections, and wherein a cross-sectional profile of each of the plurality of heat sink elements is such that that heat sink element conforms closely with a radius of the generally upright post around which the retro-fit battery system is located in use.

9. The retro-fit battery system according to any of claim 1, wherein the main body is formed of first and second separate, substantially identical, body sections, each having an interior channel that in use surrounds part of the generally upright post and which, when connected, surround the generally upright post.

10. The retro-fit battery system according to claim 9, wherein an interior wall of each body section has an aperture or cut into a hollow interior chamber to enable, in use, cabling or the like to pass from within one body section to the other.

11. The retro-fit battery system according to claim 5, wherein at least one of the body sections comprises a venting aperture extending from the interior to the exterior.

12. The retro-fit A-battery system according to claim 11, wherein the at least one venting aperture is angled so as to extend downwardly from the interior to the exterior.

13. The retro-fit A-battery system according to claim 11, wherein the at least one venting aperture is positioned towards the base of the system, and wherein a drainage aperture is provided in a base wall, in the region of the venting aperture.

14. A retro-fit battery system for attachment to a mobile workstation having a generally upright post, the retro-fit battery system comprising:

a main body formed of first and second sections hingedly attached along at least one axis and defining between the first and second sections a channel at least partially shaped to correspond substantially to an outer shape of the generally upright post, the first and second sections being configured so as to move between open and closed positions to enable the retro-fit battery system to be located around and to grip the generally upright post, one or more of the first and second sections having an exterior, at least one battery docking unit carried on the exterior of the one or more of the first or second sections, and a control system associated with delivering electrical energy to and/or from at least one battery, wherein the control system is configured to authenticate the at least one battery, which has a microprocessor that identifies the battery to the control system as being valid or invalid, and wherein at least one battery docking unit comprises a microprocessor in order to authenticate to the at least one battery when connected to that battery docking unit.

* * * * *